(No Model.)
J. F. BOLLMAN.
TREE FELLER AND BLOCK DRESSER.
No. 285,874. Patented Oct. 2, 1883.
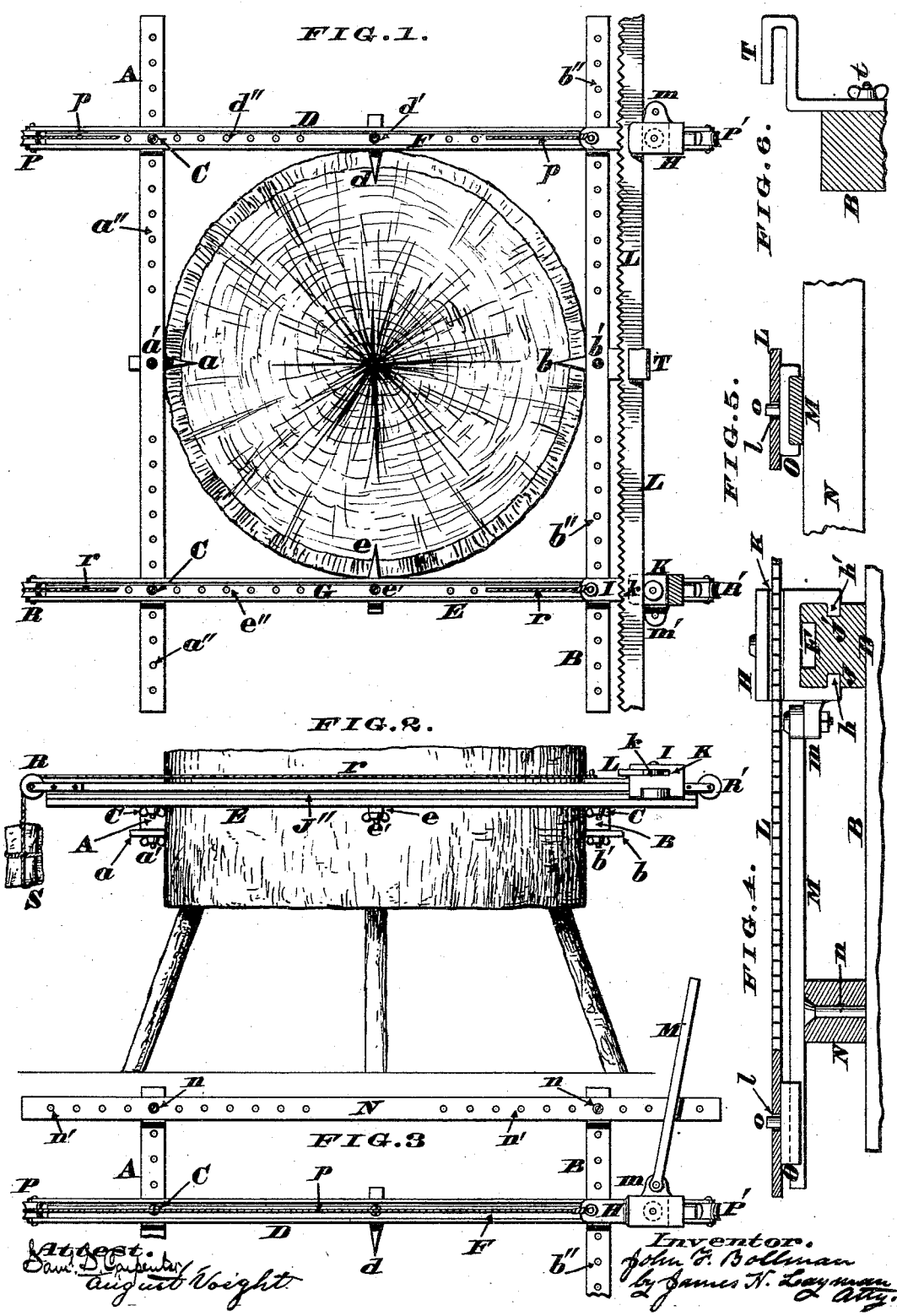

UNITED STATES PATENT OFFICE.

JOHN F. BOLLMAN, OF CINCINNATI, OHIO.

TREE-FELLER AND BLOCK-DRESSER.

SPECIFICATION forming part of Letters Patent No. 285,874, dated October 2, 1883.

Application filed June 4, 1883. (No model.)

*To all whom it may concern:*

Be it known that I, JOHN F. BOLLMAN, a citizen of the United States, residing at Cincinnati, in the county of Hamilton and State of Ohio, have invented certain new and useful Improvements in Tree-Fellers and Block-Dressers, of which the following is a specification, reference being had therein to the accompanying drawings.
The object of my invention is to provide a sectional sawing-machine that can be readily and securely framed around a tree, so as to enable the latter to be felled in the most convenient and expeditious manner, although said machine can be used for sawing the fallen timber into logs of any desired lengths, or for dressing off large pieces of wood, such as generally employed for butchers' blocks, &c. This sectional implement consists, essentially, of a pair of sills and two rails that are bolted together, so as to form a practically square frame, which frame is temporarily attached to a tree, either with dogs or other similar retaining devices, said rails having carriages mounted upon them for the purpose of guiding the saw in a proper path. These carriages have drag ropes or chains secured to them, which ropes are passed over rollers at the ends of the rails, and are weighted, so as to advance said carriages, and thereby keep the saw up to its work, as hereinafter more fully described.

Another feature of my invention consists in providing the machine with a fixed bearing-bar, a swinging arm, and a reciprocating slide, which latter is armed with a stud that passes upwardly through a hole in the saw-blade. By this arrangement any vertical vibration of the free end of the saw is prevented when the machine is worked by one man, as hereinafter more fully described.

My invention further consists in providing the machine with a detachable guide that is capable of being attached to either of the sills, so as to support the saw at its middle when it first begins to cut into the tree or block, as hereinafter more fully described.

In the annexed drawings, Figure 1 is a plan showing my machine framed around a tree, the middle portions of the drag-ropes being omitted and one of the carriages being sectioned. Fig. 2 is a side elevation, showing the machine arranged for dressing down a butcher's block. Fig. 3 is a plan showing the bearing-bar applied to the sills and the swinging arm pivoted to one of the carriages. Fig. 4 is an enlarged view, showing the saw supported on the slide of said arm. Fig. 5 is a transverse section of the saw, swinging arm, and slide. Fig. 6 is an enlarged elevation of the center guide.

A B represent two sills of any suitable size and material, said sills being provided at or near their mid-length with spurs or dogs $a\, b$, or other convenient retaining devices, these dogs being attached to said sills, either with bolts or thumb-screws, $a'\, b'$. Furthermore, these sills are pierced with a series of vertical holes, $a''\, b''$, to admit bolts or thumb-screws C, wherewith rails D E are fastened upon said sills, these rails being provided, respectively, with spurs or dogs $d\, e$, secured with thumb-screws $d'\, e'$.

$d''\, e''$ are vertical holes in the rails D E, which rails are grooved longitudinally on top, as at F G, to enable the carriages H I to travel without coming in contact with the heads of bolts C $d'\, e'$. Carriage H has side flanges, $h\, h'$, (seen in Fig. 4,) that traverse grooves J J' in the opposite sides of rail D, the other carriage, I, being provided with similar flanges that slide along the grooves J'' of rail E, one of said grooves J'' being seen in Fig. 2. Each carriage is slotted longitudinally at K to admit a suitable saw, L, the back of the latter being adapted to bear against small roller $k$, fitted in said slots.

Projecting laterally from the carriages H I are lugs $m\, m'$, to either one of which can be pivoted a swinging arm, M, that rests on a bearing-bar, N, applied parallel to either of the rails D or E, and fastened to the sills A B with bolts $n$, traversing the holes $n'$. Adapted to reciprocate on this arm M is a slide, O, armed with an upwardly-projecting lug, $o$, that passes through a hole, $l$, in the end of the saw-blade most remote from the handle thereof, it being understood that these devices M N O $o$ are used only when one man operates the machine.

Journaled in the opposite ends of rail D are rollers P P', over either of which is passed the chain or drag-rope $p$, that advances the carriage H. The other rail, E, has two similar rollers, R R', over either of which is passed the rope $r$, that advances the carriage I, the depending end of this drag-rope $r$ being weighted at S, as seen in Fig. 2, Attached near the mid-length of sill B, with a thumb-screw, t, is a guide, T, the shape of which is more clearly seen in Fig. 6.

To attach my sawing-machine to a standing tree, the sill A is first applied thereto at the desired place, and after being properly leveled is secured by driving the dog a into said tree. The other sill, B, is then fastened to the opposite side of the tree in the same manner, after which act the rails D E are dogged to said tree and bolted to the sills at C, the various holes a″ b″ d″ e″ allowing a sufficient range of adjustment to enable the sectional frame to be fitted around trees of various diameters. The frame having been thus leveled and immovably fastened to the tree or block, the carriages H I are mounted on the respective rails D E, and the drag-ropes p r are then passed over the rollers P R and weighted at S. Saw L is then inserted in the guide T and in the slots K of the carriages, the weights S serving to advance said carriages, and thereby cause the cutting-edge of said saw to penetrate the tree, the center of the saw being sustained by said guide while the first few strokes are being made; but after that the kerf keeps the saw in a level position. As soon, however, as the tree or other standing object has been cut about half-way through the carriages and saw are retracted and the saw temporarily detached from the machine. Center guide, T, is then removed and attached to the other sill, A, and carriages H I are applied to rails D E, near said sill A, the ropes p r being now passed over the rollers P′ R′, and the saw L being again fitted in said guide and carriages. The tree is now severed from this side, the kerf first made enabling the new kerf to be cut very readily, and causing the tree to fall away from the workmen.

The above describes the arrangement and operation of the machine when it is worked with two men, one at each end of the saw; but when the latter is to be run with one man the bearing-bar N is bolted near the ends of sills A B, as seen in Fig. 3, and the swinging arm M is coupled to lug m of carriage H, after which act slide O is applied to said arm M and the lug o is inserted in the hole l of the saw-blade. Consequently the slide supports the saw, and at every stroke of the latter said slide reciprocates along the arm M, which arm turns on the pivot of lug m as the saw plays laterally. It will thus be seen that the free end of the saw cannot vibrate vertically and bind in the timber being severed by it. Furthermore, the arm M can be pivoted to either of the carriages H or I, according to the position the sawyer may wish to take with reference to the machine. After the tree has been felled one of the bolts C can be unscrewed, so as to allow the various sections of the frame to be opened sufficiently to allow said frame to be detached from the tree. The frame can now be set vertically around the tree, so as to cut it into logs, the weights S being omitted, and the carriages being mounted near the upper ends of rails D E, for the purpose of guiding the saw as the latter descends.

One of the advantages peculiar to this machine is that the frame can be applied around any tree within a few inches of the ground, thereby effecting a material saving of valuable timber. Finally, the machine is quite light, and when the various sections thereof are bound together the entire apparatus can be readily carried on a boy's shoulder.

I am aware it is not new to attach supporting-frames to trees and provide these frames with slotted carriages or guides that automatically advance and keep the saw up to its work, as various forms of such machines are seen in the patents of S. H. Hamilton, December 7, 1837, L. S. Hayes, November 6, 1866, A. Smith, May 3, 1870, and W. H. Smith, January 17, 1883. Consequently my claims are not to be construed as an attempt to cover the combination of devices seen in said patents.

I claim as my invention—

1. A sawing-machine consisting of a sectional frame that can be fitted around and fastened to the tree or other object to be severed, said frame being provided with a pair of carriages that guide the advancing saw to its work, as herein described.

2. The combination, in a sawing-machine, of dogged and perforated sills A a a″ B b b″, dogged and perforated rails D d d″ E e e″, and bolts C, said rails having mounted on them the carriages H I, that guide the saw to its work, as herein described.

3. The combination, in a sawing-machine, of dogged and perforated sills A a a″ B b b″, dogged and perforated rails D d d″ E e e″, and bolts C, said rails having mounted on them the carriages H I, each of which is slotted at K, and provided with a roller k, against which latter bears the back of saw L, as herein described.

4. In combination with a sawing-machine consisting of the sills A a a″ B b b″, coupled to and supporting the rails D d d″ E e e″, as herein described, the slotted carriages H K k I K k, and fixed guide T, which latter is attached to either one of said sills, and sustains the saw L at or near its mid-length, as herein explained.

5. In a sawing-machine, the fixed bar N, located outside of but parallel with either of the rails D or E, and attached to the sills A B, said bar serving as the bearing for the swinging arm M, which latter is pivoted at m to one of the saw-carriages and supports the reciprocating slide O, whose upwardly-projecting lug o engages with a hole, l, of saw-blade L, for the purpose stated.

In testimony whereof I affix my signature in presence of two witnesses.

JOHN F. BOLLMAN.

Witnesses:
 JAMES H. LAYMAN,
 LOUIS C. BOLLMAN.